United States Patent
Kuo

(10) Patent No.: US 11,868,070 B2
(45) Date of Patent: Jan. 9, 2024

(54) ARTIFACT REDUCTION USING A COMPENSATION IMAGE

(71) Applicant: Eastman Kodak Company, Rochester, NY (US)

(72) Inventor: Chung-Hui Kuo, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 17/836,100

(22) Filed: Jun. 9, 2022

(65) Prior Publication Data
US 2022/0413421 A1    Dec. 29, 2022

Related U.S. Application Data

(60) Provisional application No. 63/214,834, filed on Jun. 25, 2021.

(51) Int. Cl.
G03G 15/00 (2006.01)
G06K 15/02 (2006.01)
G06K 15/14 (2006.01)

(52) U.S. Cl.
CPC ........... *G03G 15/50* (2013.01); *G06K 15/14* (2013.01); *G06K 15/1823* (2013.01)

(58) Field of Classification Search
CPC ...... G03G 15/50; G03G 15/55; G03G 15/556; G06K 15/14; G06K 15/1823
See application file for complete search history.

(56) References Cited

U.S. PATENT DOCUMENTS

| | | | |
|---|---|---|---|
| 9,091,998 B2 | 7/2015 | Hashimoto | |
| 2014/0240803 A1* | 8/2014 | Wu | G03G 15/556 358/504 |
| 2020/0073607 A1* | 3/2020 | Uchida | G03G 15/556 |

OTHER PUBLICATIONS

NexPress Specialty Substrate Leveler User's Guide, Eastman Kodak Co., Publication ID: UG8350-1_en, 2008.
Kodak Digital Press: Printing on Pre-Collated Media (PCM) User Guide, Publication ID: UGSU00-00, 2019.

* cited by examiner

*Primary Examiner* — Sandra Brase
(74) *Attorney, Agent, or Firm* — David A. Novais

(57) ABSTRACT

A method for reducing artifacts in an electrophotographic printing system includes receiving a print job including image data for a set of pages. The electrophotographic printing system is used to print a block of pages from the print job to provide corresponding printed pages. The image data for the block of pages is analyzed to determine an average toner usage rate. If the determined average toner usage rate for the block of pages falls outside an acceptable toner usage rate range, image data for a compensation image and a number of compensation images are determined such that the average toner usage rate will be brought back into the acceptable toner usage rate range.

18 Claims, 7 Drawing Sheets

ARTIFACT REDUCTION USING A COMPENSATION IMAGE

CROSS-REFERENCE TO RELATED APPLICATIONS

This application claims the benefit of U.S. Provisional Patent Application No. 63/214,834, filed Jun. 25, 2021, which is incorporated herein by reference in its entirety.

Reference is made to commonly assigned, U.S. Patent Application Ser. No. 63/166,266, entitled: "Electrophotographic printing system with reduced burn-in artifacts," by T. Schwartz et al.; to commonly assigned, U.S. Patent Application Ser. No. 63/166,267, entitled: "Electrophotographic printing system including lateral translations to reduce burn-in artifacts," by T. Schwartz et al.; and to commonly assigned, co-pending U.S. patent application Ser. No. 17/836,121, entitled: "Reducing image burn-in artifacts using a compensation image," by C.-H. Kuo, each of which is incorporated herein by reference.

FIELD OF THE INVENTION

This invention pertains to the field of digital printing, and more particularly to electrophotographic printing systems having reduced artifacts.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multicolor print image on the receiver.

One problem that can occur in electrophotographic printing systems is known as "image burn-in" which occurs when a sequence of the same or similar pages having similar image data or patterns are printed. In this case, the performance of various system components can change as a function of position due to the repeated printing of the similar image data or patterns. This can cause subsequently printed images to have characteristics that vary in accordance with the repeated image data or pattern, thereby having a negative impact on image quality. Such artifacts are commonly referred to as "image burn-in artifacts." This can require that the affected system components be more frequently serviced or even replaced to eliminate the artifacts which can add significant cost and system down-time.

Problems can also occur in electrophotographic printing systems if the rate that toner is supplied by the developing subsystem (sometimes referred to as the toner usage rate or the toner take-out rate) is too low or too high. If the toner take-out rate exceeds the system replenishment capability, then image nonuniformity artifacts can occur. On the other hand, if the toner take-out rate is low for an extended period, the toner electric charge in the development subsystem will reach an elevated level which can create imaging artifacts such as mottle at high density levels and disruption of halftone dots at low density levels.

There remains a need for an improved method to reduce image burn-in artifacts when printing an extended sequence of similar pages in an electrophotographic printing system, as well as artifacts associated with too low or too high toner usage rates.

SUMMARY OF THE INVENTION

The present invention relates to a method for reducing artifacts in an electrophotographic printing system, including:

receiving a print job including image data for a set of pages to be printed with the electrophotographic printing system;

using the electrophotographic printing system to print a block of pages from the print job to provide corresponding printed pages, wherein the electrophotographic printing system includes a development subsystem that supplies toner used to form the printed pages;

analyzing the image data for the block of pages to determine an average toner usage rate;

defining an acceptable toner usage rate range, wherein the development subsystem supplies toner with an acceptable charge when the average toner usage rate is within the acceptable toner usage rate range;

if the determined average toner usage rate for the block of pages is outside the acceptable toner usage rate range:
  determining image data for a compensation image; and
  determining a number of compensation images to be printed;
  wherein the image data for the compensation image and the number of compensation images are determined such that the average toner usage rate will be brought back into the acceptable toner usage rate range when the determined number of compensation images are printed using the electrophotographic printing system.

This invention has the advantage that artifacts that result when toner usage rates in an electrophotographic printer are too high or too low are reduced or prevented.

It has the additional advantage that the compensation images can also provide reduced image burn-in artifacts.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
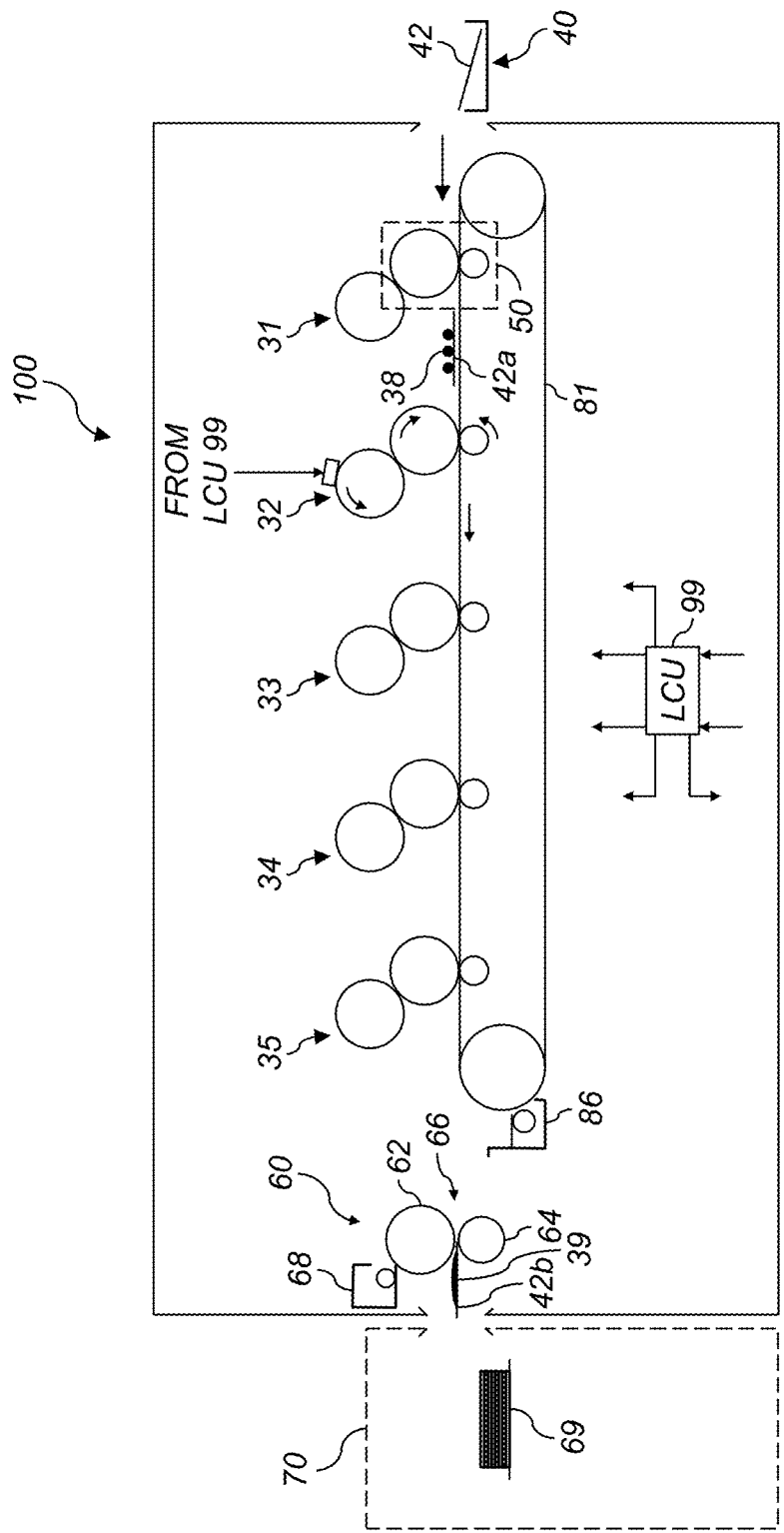
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters (e.g., less than 8 µm, on the order of 10-15 µm, up to approximately 30 µm, or larger), where "diameter" preferably refers to the volume-weighted median diameter, as determined by a device such as a Coulter Multisizer. When practicing this invention, it is preferable to use larger toner particles (i.e., those having diameters of at least 20 µm) in order to obtain the desirable toner stack heights that would enable macroscopic toner relief structures to be formed.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-20 µm or 20-300 µm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "printing module" or a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

The DFE receives input electronic files (such as Postscript command files) composed of images from other input devices (e.g., a scanner, a digital camera or a computer-generated image processor). Within the context of the present invention, images can include photographic renditions of scenes, as well as other types of visual content such as text or graphical elements. Images can also include invisible content such as specifications of texture, gloss or protective coating patterns.

The DFE can include various function processors, such as a raster image processor (RIP), image positioning processor, image manipulation processor, color processor, or image storage processor. The DFE rasterizes input electronic files into image bitmaps for the printing module to print. In some embodiments, the DFE permits a human operator to set up parameters such as layout, font, color, paper type, or post-finishing options. The printing module takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system that accounts for characteristics of the image printing process implemented in the printing module (e.g., the electrophotographic process) to provide known, consistent color reproduction characteristics. The color management system can also provide known color reproduction for different inputs (e.g., digital camera images or film images). Color management systems are well-known in the art, and any such system can be used to provide color corrections in accordance with the present invention.

In an embodiment of an electrophotographic modular printing machine useful with various embodiments (e.g., the NEXPRESS SX 3900 printer manufactured by Eastman Kodak Company of Rochester, NY) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
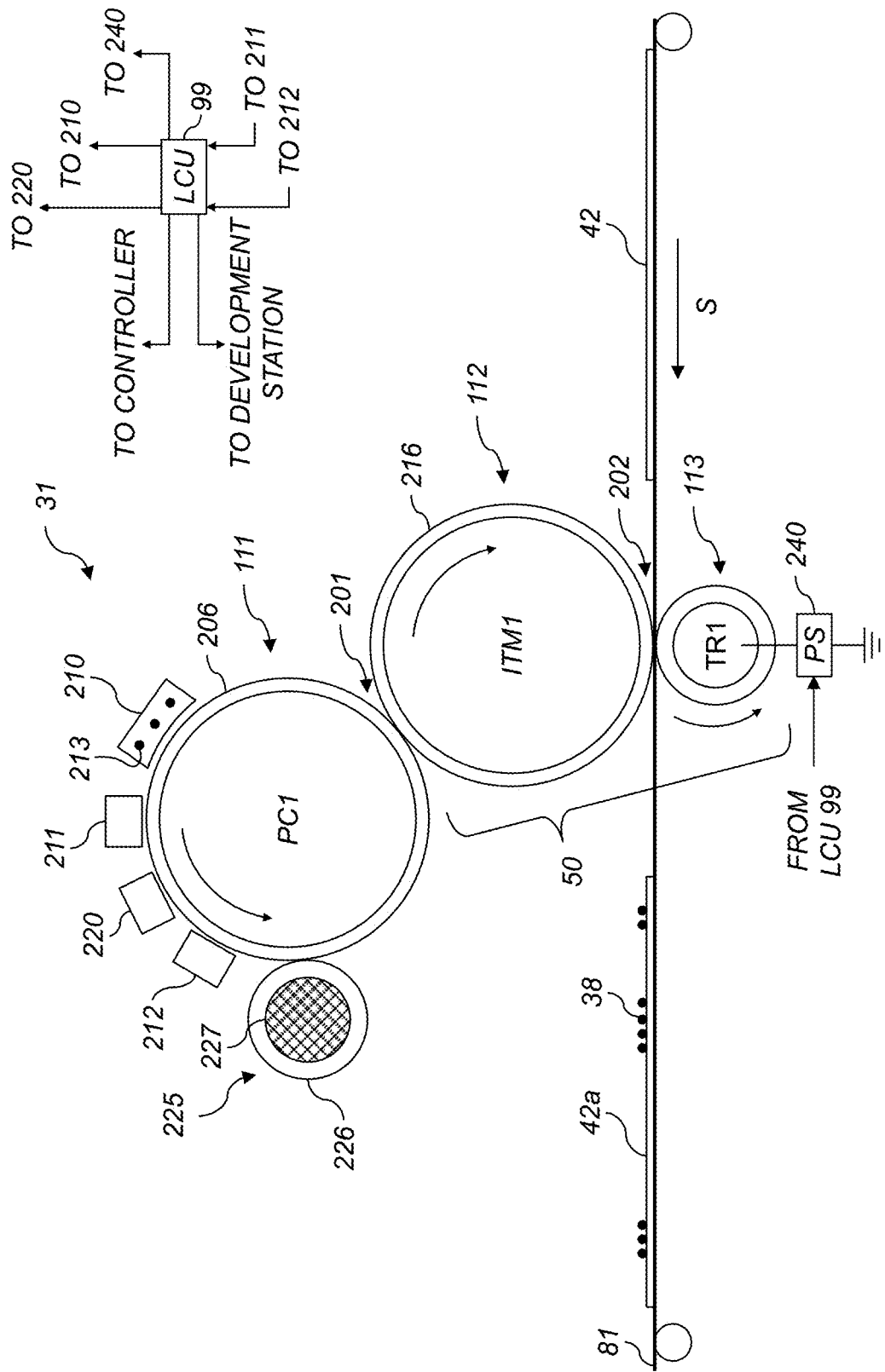
FIG. 2 is an elevational cross-section of one printing module of the electrophotographic printer of FIG. 1.

FIGS. 1-2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatuses can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, also known as electrophotographic imaging subsystems. Each printing module 31, 32, 33, 34, 35 produces a single-color toner image for transfer using a respective transfer subsystem 50 (for clarity, only one is labeled) to a receiver 42 successively moved through the modules. In some embodiments one or more of the printing modules 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing modules 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing module 31 forms black (K) print images, printing module 32 forms yellow (Y) print images, printing module 33 forms magenta (M) print images, and printing module 34 forms cyan (C) print images.

Printing module 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42a is shown after passing through printing module 31. Print image 38 on receiver 42a includes unfused toner particles. Subsequent to transfer of the respective print images, overlaid in registration, one from each of the respective printing modules 31, 32, 33, 34, 35, receiver 42a is advanced to a fuser module 60 (i.e., a fusing or fixing assembly) to fuse the print image 38 to the receiver 42a. Transport web 81 transports the print-image-carrying receivers to the fuser module 60, which fixes the toner particles to the respective receivers, generally by the application of heat and pressure. The receivers are serially de-tacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42b carrying fused image 39) are transported in series from the fuser module 60 along a path either to an output tray 69, or back to printing modules 31, 32, 33, 34, 35 to form an image on the backside of the receiver (i.e., to form a duplex print). Receivers 42b can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42b passes through a finishing system 70. Finishing system 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

Image data for printing by printer 100 can be processed by a raster image processor (RIP; not shown), which can include a color separation screen generator or generators. The output of the RIP can be stored in frame or line buffers for transmission of the color separation print data to each of a set of respective LED writers associated with the printing modules 31, 32, 33, 34, 35 (e.g., for black (K), yellow (Y), magenta (M), cyan (C), and red (R) color channels, respectively). The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes (e.g., color correction) in order to obtain the desired color print. Color image data is separated into the respective colors and converted by the RIP to halftone dot image data in the respective color (for example, using halftone matrices, which provide desired screen angles and screen rulings). The RIP can be a suitably-programmed computer or logic device and is adapted to employ stored or computed halftone matrices and templates for processing separated color image data into rendered image data in the form of halftone information suitable for printing. These halftone matrices can be stored in a screen pattern memory.

FIG. 2 shows additional details of printing module 31, which is representative of printing modules 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing modules. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing module 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and then to a receiver 42 which receives respective toned print images 38 from each printing module in superposition to form a composite image thereon. The print image 38 is, for example, a separation of one color, such as cyan. Receiver 42 is transported by transport web 81. Transfer to a receiver is affected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a.

In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NEXPRESS SX 3900. In some embodiments, a single transfer member is used to sequentially transfer toner images from each color channel to the receiver 42. In other embodiments, the separate toner images can be transferred in register directly from the photoreceptor 206 in the respective printing module 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing module 31, 32, 33, 34, 35 (FIG. 1), among other components. Each printing module can also have its own respective controller (not shown) coupled to LCU 99.

As discussed in the background section, one problem that can occur in electrophotographic printing systems is known as "image burn-in" which can occur when a sequence of the same or similar pages having similar image data or patterns are printed. In this case, the performance of various system components can change as a function of position due to the repeated printing of the similar image data or patterns. This can cause subsequently printed images to have characteristics that vary in accordance with the repeated image data or pattern (i.e., "image burn-in artifacts"). This can require that the affected system components be frequently serviced, or even replaced, to eliminate the artifacts which can add significant cost and system down-time.

One system component that has been found to be particularly susceptible to the formation of image burn-in artifacts is the fuser module 60 (see FIG. 1). The toner stacks that form the print image 38 on the receiver 42 generally have a higher roughness than the receiver 42. As a result, when the receiver 42 passes through the fuser module 60, the roughness of the toner can affect the surface of the fusing roller 62. If a large number of pages are printed that have high-density image content at the same cross-track position, the surface characteristics of the corresponding portion of the fusing roller 62 can be changed (e.g., roughened) relative to the portions of the fusing roller 62 that correspond to low-density image content. The spatially-dependent surface characteristics of the fusing roller 62 can then affect the image quality of subsequently printed pages. For example, the gloss of the printed image can be lower in the image regions corresponding to the roughened surface of the fusing roller 62.

Other system components besides the fuser module 60 can also contribute to the formation of burn-in artifacts. For example, the response of the photoreceptor 206 (FIG. 2) can become position dependent when the same image content is repeated imaged.

Figure 3C:
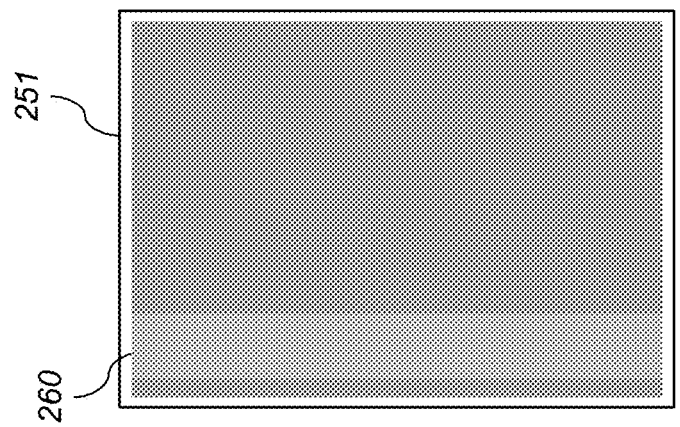
FIG. 3C illustrates image burn-in artifacts formed from the fuser roller of FIG. 3B.
Figure 3B:
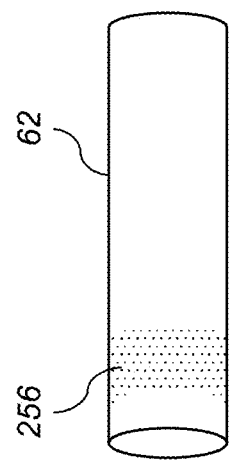
FIG. 3B illustrates a fuser roller having a roughened surface in regions corresponding to the dark image content in the page of FIG. 3A.
Figure 3A:
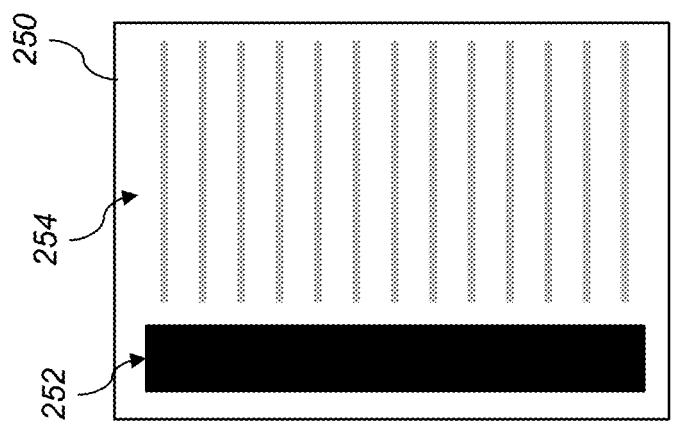
FIG. 3A is an example of a page having image content that is susceptible to producing image burn-in artifacts.

FIG. 3A shows an example of a page 250 that is susceptible to producing image burn-in artifacts when printed repeatedly. The page 250 includes dark image content 252 which occurs in a particular cross-track position together with light image content 254. Over time, the dark image content 252 can modify the surface of the fusing roller 62, producing a roughened surface 256 as shown in FIG. 3B, when many copies of the page 250 are printed. The roughened surface 256 can in turn produce image burn-in artifacts 260 in a subsequently printed page 251 (in this example a uniform gray field) as shown in FIG. 3C. In this case, the image burn-in artifacts 260 show up as a lower gloss level in the cross-track positions that correspond to the dark image content 252 in page 250.

Other types of artifacts can occur in electrophotographic printers 100 when the rate at which toner is supplied by the development subsystem 225 is too high or too low. If the toner usage rate is too high, there is insufficient time for the newly added toner to reach the target electric charge evenly across the toning station. (The toner usage rate is sometimes referred to as the tone take-out rate.) This can result in low frequency nonuniformity artifacts in high coverage image area. On the other hand, if the toner usage rate is low for an extended period, the toner electric charge in the development subsystem will reach an elevated level which can create imaging artifacts such as mottle at high density levels and disruption of halftone dots at low density levels.

The present invention represents a method or system for reducing image burn-in artifacts and artifacts resulting from low or high toner usage rates by printing "compensation images" at specified intervals. The compensation images are not part of the print job and are intended to be discarded after printing. In an exemplary embodiment, the compensation images have cross-track image profiles that are inverted relative to the average cross-track image profiles for the pages in the print job in order to mitigate the image burn-in artifacts, and have a controlled average density level that mitigates the charge buildup/depletion in the development subsystem 225.

Figure 4:
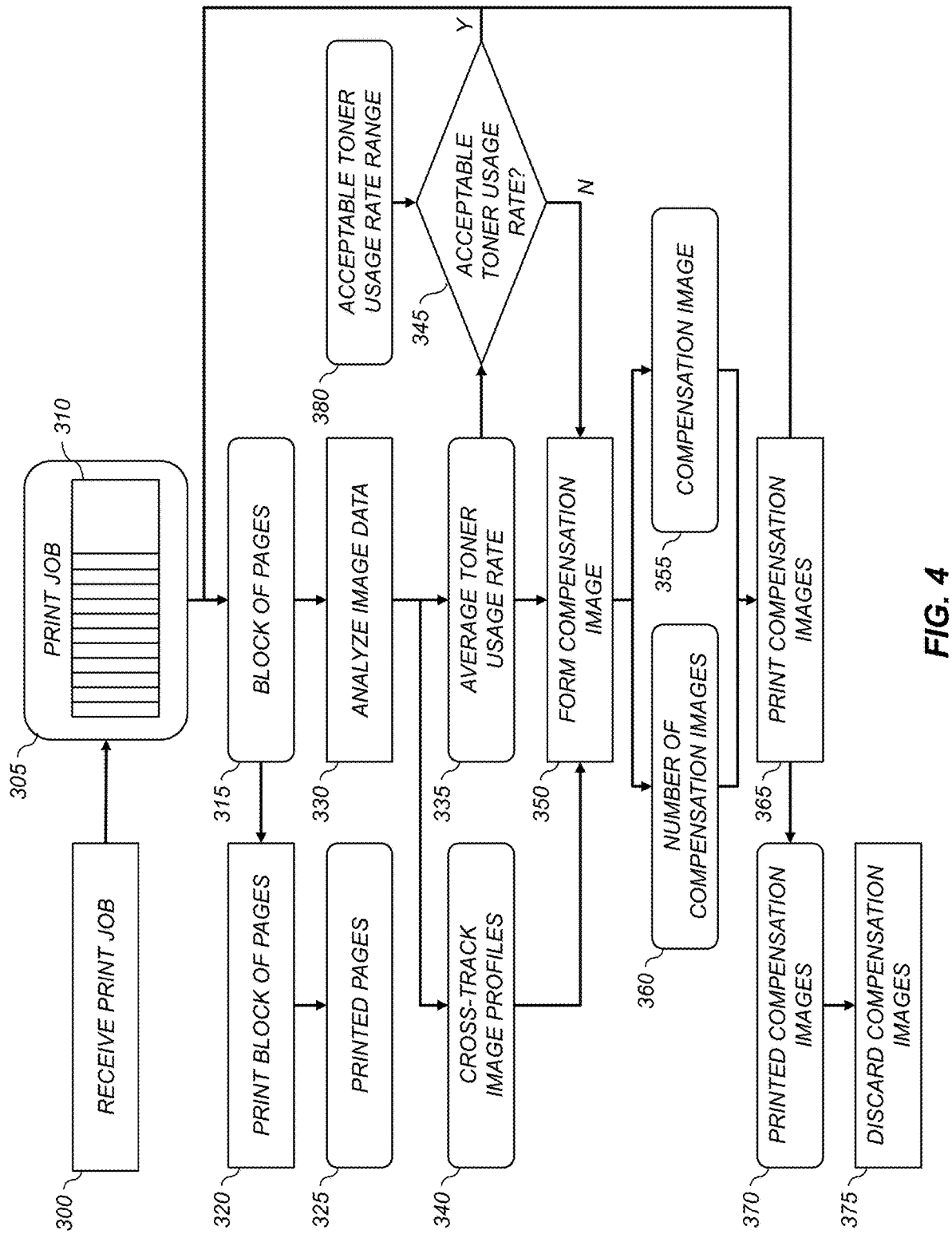
FIG. 4 is a flowchart of a method for printing with reduced artifacts in accordance with an exemplary embodiment.

FIG. 4 shows a flowchart of a method that can be used to implement the present invention in accordance with an exemplary embodiment. A print job 305 including image data for a set of pages 310 is received using a receive print job step 300.

In some cases, the print job 305 may contain a sequence of pages 310 that include image data or patterns (for example, image content) that are identical or substantially similar. For example, the print job 305 may contain multiple copies of the same page 310, or may include a series of pages 310 that include similar image content (e.g., a form letter where the name and address of the recipient vary but the rest of the page content is identical). The similar pages may correspond to all of the pages 310 in the print job 305, or may correspond to a subset of the pages 310 in the print job 305. In cases where there are a significant number of similar pages, image burn-in artifacts can be formed as discussed relative to FIGS. 3A-3C In accordance with the present invention, the pages 310 in the print job 305 are processed in a block-wise fashion, where a print block of pages step 320 is used to print a block of pages 315 using the printer 100 to provide corresponding printed pages 325. In an exemplary embodiment the block of pages 315 has a block size of S=50 pages. In other embodiments, other block sizes can be used such as block sizes in the range of 10≤S≤200 pages 310.

An analyze image data step 330 is then used to analyze the image data for the block of pages 315. In an exemplary embodiment, the analyze image data step 330 determines an average toner usage rate 335 and cross-track image profiles 340 for the block of pages 315.

Consider a block of images 315 where the image data for the $i^{th}$ page 310 is given by $I_h^i(x,y)$, where h is the color channel (e.g., cyan, magenta, yellow, black or other spot colors) and x and y are the cross-track and in-track pixel positions, respectively. The image data will typically be represented by 8-bit integers where a value of 0 corresponds to printing no toner, and a value of 255 corresponds to printing a maximum amount of toner.

Cross-track image profiles 340, $P_h^i(x)$, for each page can be determined by averaging all of the pixels at a particular cross-track position:

$$P_h^i(x) = \frac{1}{N_y}\sum_{y=1}^{N_y} I_h^i(x, y) \tag{1}$$

where $N_y$ is the number of rows in the image data (i.e., the number of pixels in the in-track dimension).

Figure 5:
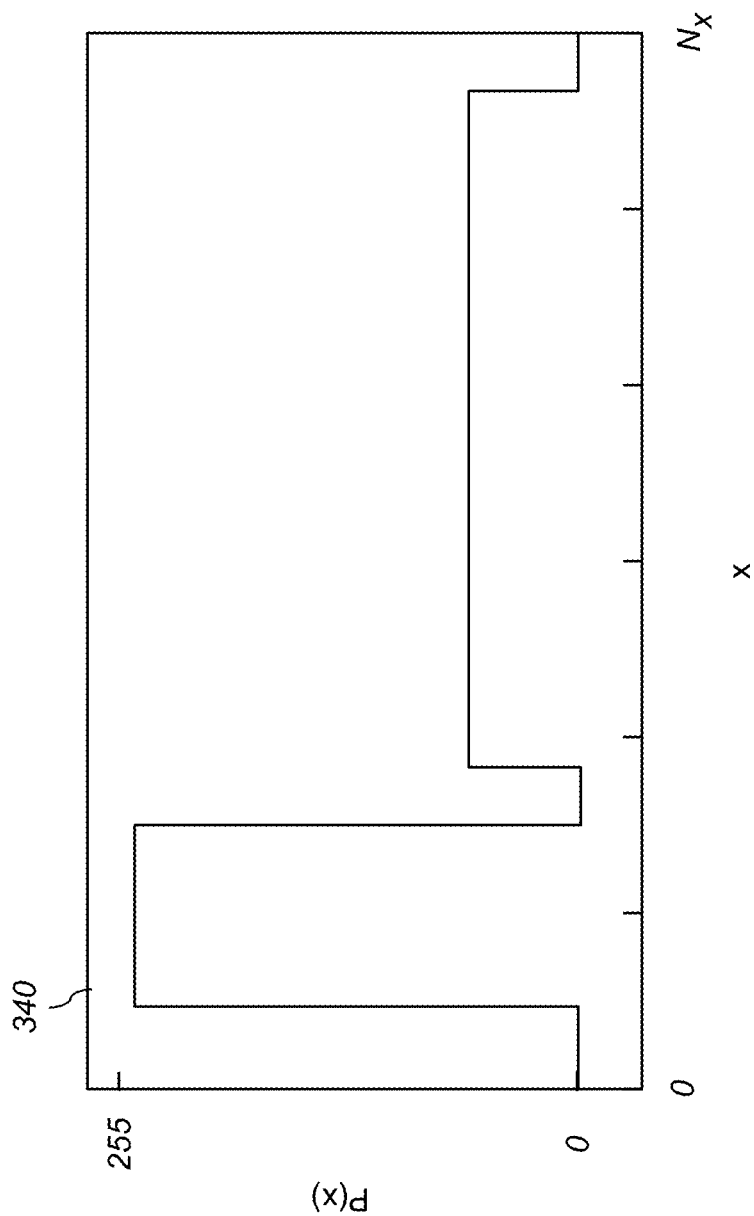
FIG. 5 illustrates a cross-track image profile determined from the image data for the exemplary page of FIG. 3A.

FIG. 5 shows a cross-track image profile 340 determined using Eq. (1) for the exemplary page 250 shown in FIG. 3A. It can be seen that toward the left edge of the cross-track image profile 340 there is a large peak in the cross-track image profile 340 corresponding to the black bar in the image content which extends down the length of the page 250. There is also a broad peak with a smaller magnitude corresponding to the horizontal lines of text in the page 250.

Returning to a discussion of FIG. 4, the analyze image data step 330 also determines an average toner usage rate 335 for the block of pages 315. In an exemplary embodiment, the average toner usage rate 335 for color channel h can be determined using the following equation:

$$\bar{V}_h = \frac{1}{N_x S}\sum_{i=1}^{S}\sum_{x=1}^{N_x} P_h^i(x) \tag{2}$$

where S is the number of pages in the block of pages 315 and $N_x$ is the number of columns in the image data (i.e., the number of pixels in the cross-track dimension). Note that this average toner usage rate value will be in terms of the average pixel value in the block of images. Conventionally, toner usage rates are measured in terms of physical values such as average toner mass per unit area per page. The determined value of $\overline{V}_h$ will be approximately proportional to the physical toner usage rate. Within the context of the present invention, the term "toner usage rate" is used to refer to any quantity which is used as a measure of the amount of toner applied per page, whether or not the quantity is tied directly to physical quantities.

An acceptable toner usage rate test 345 is used to compare the determined average toner usage rate 335 to a predefined acceptable toner usage rate range 380. In an exemplary embodiment, the acceptable toner usage rate range 380 is defined by a minimum acceptable toner usage rate $V_L$ and a maximum acceptable toner usage rate range $V_H$ such that the acceptable toner usage rate test 345 can be performed by determining whether or not the average toner usage rate 335 satisfies the inequality: $V_L \leq \overline{V}_h \leq V_H$. In an exemplary embodiment, the minimum acceptable toner usage rate $V_L$ and the maximum acceptable toner usage rate range $V_H$ are determined by experimentation. The minimum acceptable toner usage rate $V_L$ corresponds to the point where imaging artifacts are formed due to toner electric charge in the development subsystem (FIG. 2) reaching an elevated level. The maximum acceptable toner usage rate range $V_H$ corresponds to the point where image nonuniformity artifacts are formed when the toner usage rate exceeds the system replenishment capability. In some embodiments, the same acceptable toner usage rate range can be used for each color channel. In other embodiments, different acceptable toner usage rate ranges can be defined for each of the color channels.

The acceptable toner usage rate range 380 can be determined using any appropriate means. For example, $V_L$ can be determined experimentally as the lowest average coverage where a 1000 page print job can be printed with a negligible increase in the charging voltage, and $V_H$ can be defined as the highest average coverage where a 100 page print job with monochrome flat field images with 100% coverage remain within a uniformity specification.

Preferably, the average toner usage rates 335 for each of the color channels are evaluated against the acceptable toner usage rate range 380. In an exemplary embodiment, if the average toner usage rate 335 for any of the color channels do not satisfy the inequality then the acceptable toner usage rate test 345 returns a value of "No" and control is passed to the form compensation image step 350, and if the average toner usage rate for all of the color channels satisfy the inequality then the acceptable toner usage rate test 345 returns a value of "Yes" and the method proceeds to print the next block of pages 315.

A form compensation image step 350 is used to form a compensation image 355 and determine a number of compensation images 360 that should be printed. For embodiments where the compensation image 355 is used to compensate for average toner usage rates 335 that are outside of the acceptable toner usage rate range 380, the compensation image 355 and the number of compensation images 360 are determined such that the average toner usage rate will be brought back into the acceptable toner usage rate range 380 when the determined number of compensation images 360 are printed using the electrophotographic printing system (i.e., printer 100).

The new average toner usage rate $\overline{V}_h'$ can be computed by computing a weighted average of the average toner usage rates 335 for the block of pages 315 and an average toner usage rate $\overline{V}_c$ for the compensation images 355:

$$\overline{V}_h' = \frac{S\overline{V}_h + K\overline{V}_c}{S + K} \quad (3)$$

where K is the number of compensation images 360.

In some embodiments, the compensation images are only used to compensate for average toner usage rates 335 that are outside the acceptable toner usage rate range 380, and are not used to compensate for image burn-in artifacts. In this case, the simplest case is to define a uniform compensation image 355. For example, if the average tone usage rate 335 is too low (i.e., $\overline{V}_h < V_L$), the fastest way to bring the average toner usage rate back into the acceptable toner usage rate range 380 is to use a uniform composition image 355 having a code value of $V_H$ such that $\overline{V}_c = V_H$. The minimum number of compensation images 350 can then be determined by solving Eq. (3) for K using $\overline{V}_h' = V_L$:

$$K_{m,h} = \left\lceil \frac{S(V_L - \overline{V}_h)}{(V_H - V_L)} \right\rceil \quad (4a)$$

where the notation $\lceil g \rceil$ denotes a rounding up to the next integer operation.

Similarly, if the average tone usage rate 335 is too high (i.e., $\overline{V}_h > V_H$), the fastest way to bring the average toner usage rate back into the acceptable toner usage rate range 380 is to use a uniform composition image 355 having a code value of 0 (i.e., a blank page) such that $\overline{V}_c = 0$. The minimum number of compensation images 350 can then be determined by solving Eq. (3) for K using $\overline{V}_h' = V_H$:

$$K_{m,h} = \left\lceil \frac{S(\overline{V}_h - V_H)}{V_H} \right\rceil \quad (4b)$$

Generally, different minimum numbers of compensation images 350 may be determined for each color channel. Then the number of composition images 350 can then be set to the maximum of the values computed for each color channel:

$$K_m = \max[K_{m,h}] \quad (5)$$

where the max[·] operation is performed across the color channels, h.

In some cases, it may be desirable to use a number of compensation images (K) 360 that is larger than the minimum number $K_m$. For example, it may be desirable to use a number of compensation images 360 that is a multiple of the number of pages that fit on the transport web 81 (FIG. 1).

The code values used for the compensation image 355 can be different in each color channel. For example, if the average toner usage rate 335 for one color channel is too low, then the code value for that color channel of the composition image 355 can be set to VH, while the code value for another color channel can be set to 0 if the average toner usage rate 335 is too high. For color channels where the average toner usage rate 335 is within the acceptable toner usage range 380, the code value can be set to $V_L$ to insure that the average toner usage rate remains within the acceptable range while minimizing the amount of toner that is used.

In some embodiments, the compensation images 355 are used to reduce image burn-in artifacts. As discussed earlier with respect to FIG. 3B, image burn-in artifacts can result when the image content of the pages 310 causes position-dependent roughening of the fusing roller 62. The roughened surface 256 can in turn produce artifacts such as a differential gloss on subsequently printed page 251 as shown in FIG. 3C. To mitigate the formation of such artifacts, the compensation images 355 of the present invention can be used to reduce the position-dependent roughening of the fusing roller 62 by arranging the image content of the compensation images 355 such that it is inverted relative to that of the block of pages 315. In this way, printing the compensation images 355 will roughen the surface of the fusing roller 62 in a way that is complementary to the roughening caused by the block of pages 315, therefore keeping the surface roughness approximately uniform.

In an exemplary embodiment, the form compensation image step 350 can determine compensation images 355 for reducing image burn-in artifacts using the following process. First, a low-pass filter is applied to the cross-track image profiles 340, $P_h^i(x)$, for each page to blur them out in the cross-track direction forming corresponding filtered cross-track image profiles, $\tilde{P}_h^i(x)$:

$$\tilde{P}_h^i(x) = P_h^i(x) * L(x) \qquad (6)$$

where "*" indicates a convolution operation, and L(x) is the low-pass filter (for example, a 32 pixel wide box-car filter or a Gaussian filter).

Next a total compensation image profile for each color channel, $C_h(x)$, is determined by inverting and summing the filtered cross-track image profiles:

$$C_h(x) = \sum_{i=1}^{S} C_h^i(x) = \sum_{i=1}^{S} (P_{max} - \tilde{P}_h^i(x)) \qquad (7)$$

where $P_{max}$ is a maximum possible value of the filtered cross-track image profiles $\tilde{P}_h^i(x)$. For example, in some embodiments, $P_{max}=255$. It can be seen that Eq. (7) has the effect of inverting the cross-track image profiles so that the total compensation image profile will have an inverted shape relative to the cross-track image profiles. That is, where the average of the cross-track image profiles is high, the total compensation image profile will be low, and vice versa.

To minimize the toner usage when printing the compensation images 355, the minimum value of the total compensation image profile can be subtracted without any loss in the effectiveness at reducing the image burn-in artifacts:

$$C'_h(x) = C_h(x) - \min[C_h(x)] \qquad (8)$$

where the min[·] operation finds the minimum value of the total compensation image profile across all cross-track positions.

The shifted total compensation image profile $C'_h(x)$ represents the total amount of toner that should be applied in the compensation images 355 as a function of cross-track position. Generally, the maximum value of $C'_h(x)$ will exceed 255, indicating that the toner to be printed will need to be divided between multiple compensation images 355. The minimum number of compensation images $K_m$ can be determined by dividing the maximum value of the shifted total compensation image profile $C'_h(x)$ by the maximum printable code value (e.g., $P_{max}=255$) and rounding up:

$$K_m = \left\lceil \frac{\max[C'_h(x)]}{P_{max}} \right\rceil \qquad (9)$$

where the max[·] operation is performed across all cross-track positions. As discussed earlier, in some cases, it may be desirable to use a number of compensation images (K) 360 that is larger than the minimum number $K_m$. The number of compensation images 360 can be defined using any appropriate selection strategy as long as $K \geq K_m$.

The cross-track image profile $\hat{C}_h(x)$ for the compensation images 355 can be determined by dividing the shifted total compensation image profile $C'_h(x)$ by the number of compensation images:

$$\hat{C}_h(x) = C'_h(x)/K \qquad (10)$$

In some embodiments, the equation for cross-track image profile can be modified to include a sensitivity threshold $\delta$ and a tunable gain factor $\lambda$ which can be used to account for the damping effect from the printed image data to the overall printing system:

$$\hat{C}_h(x) = \min[\lambda(\max[C'_h(x)/K - \delta, 0]), P_{max}] \qquad (11)$$

where the max[·] and min[·] operations have the effect of limiting the values to be between $0 \leq \hat{C}_h(x) \leq P_{max}$.

The compensation image 355 can then be formed by repeating the cross-track image profile $\hat{C}_h(x)$ for each row of the compensation image 355.

Figure 6:
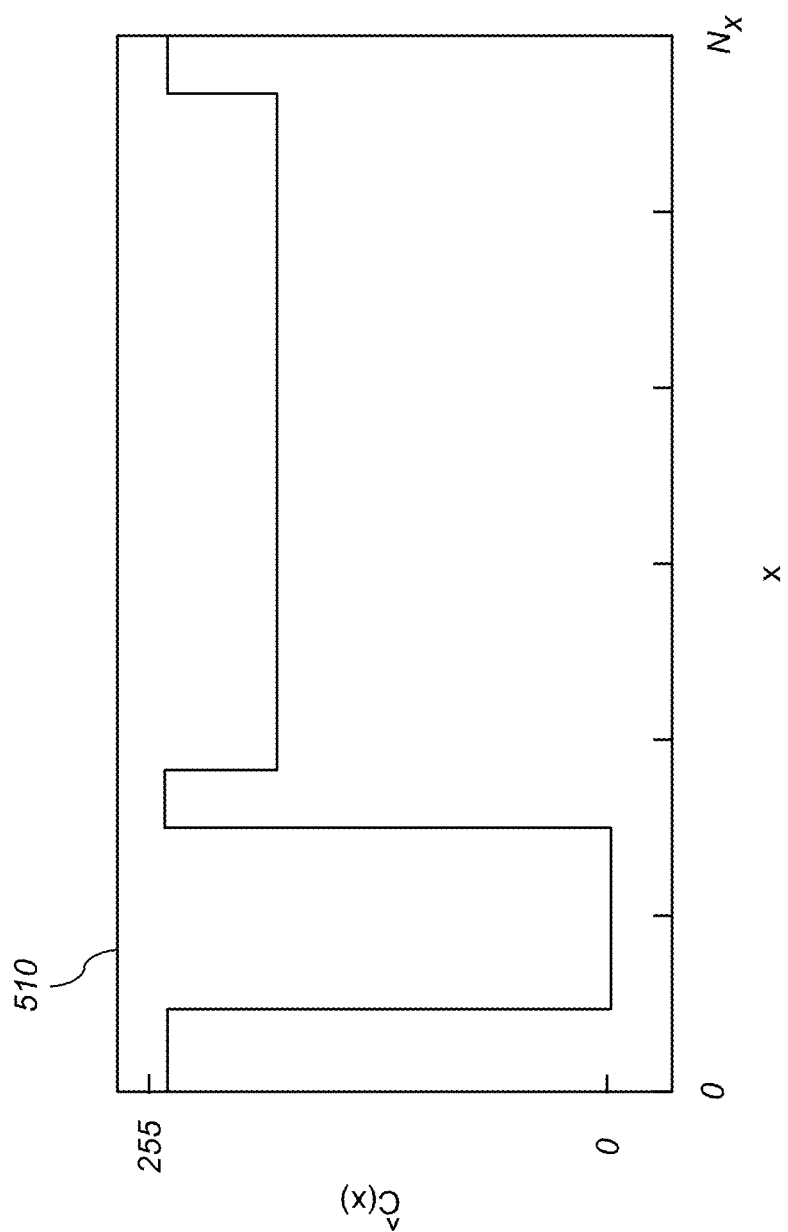
FIG. 6 illustrates an exemplary cross-track image profile for a compensation image determined from the cross-track image profile of FIG. 5.

FIG. 6 illustrates an exemplary cross-track image profile 510 for a compensation image 355 determined for a block of pages 315 having the average cross-track image profile 340 of FIG. 5. It can be seen that the cross-track image profile 510 for a compensation image 355 has in inverted shape relative to the average cross-track image 340 determined for the block of pages 315.

Figure 7:
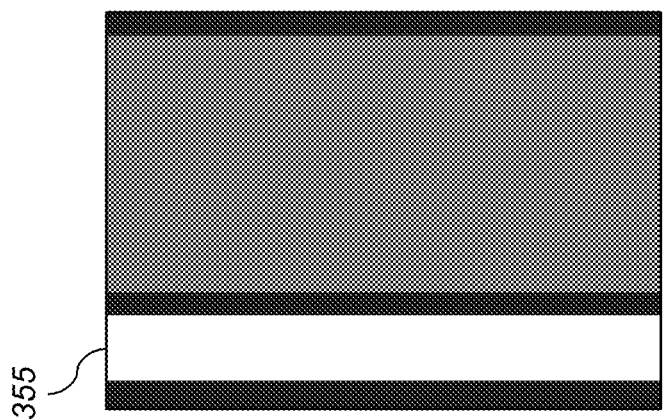
FIG. 7 illustrates an exemplary compensation image corresponding to the cross-track image profile of FIG. 6.

FIG. 7 shows an exemplary compensation image 355 formed from the cross-track image profile 510 of FIG. 6. The cross-track image profile 510 is used to define the pixel values for a row of the compensation image 355, and the row is then repeated down the page.

A toner usage rate for the resulting compensation image 355 can be determined using:

$$\bar{V}_c = \frac{1}{N_x} \sum_{x=1}^{N_x} \hat{C}_h(x) \qquad (12)$$

An average toner usage rate 335 including the block of pages 315 and the compensation images 355 can then be computed using Eq. (3) to confirm that it falls within the acceptable toner usage rate range 380. If the average toner usage rate 335 falls outside of the acceptable toner usage rate range 380, adjustments can be made in a number of different ways. In an exemplary embodiment, after printing the compensation images 355 with the determined cross-track image profile $\hat{C}_h(x)$, additional uniform composition images can be printed (e.g., blank pages to reduce the ink usage rate or solid pages with code value $V_H$ to increase the ink usage rate as was discussed earlier). The number of additional uniform composition images can be calculated using Eqs. (4a)-(4b) where the average toner usage rate used in the equations is that computed from the printed block of pages 315 together with the printed compensation images 355. In other embodiments, the cross-track image profile for the compensation image can be modified to increase or decrease the toner usage rate as necessary. In this case, it will generally be necessary to increase the number of compensation images 360 accordingly in order to keep the same differential toner laydown.

Once the compensation image 355 and the number of compensation images 360 have been determined, a print compensation images step 365 is used to form printed compensation images 370. Since the printed compensation images 370 do not belong to the print job 305, they should not be directed into the same locations as the printed pages 325 (e.g., output tray 69) and can be discarded using a discard compensation images step 375. In an exemplary embodiment, the discard compensation images step 375 directs the printed compensation images 370 into an appropriate waste receptacle. For example, the waste receptacle could be an alternate output tray, or a trash bin, or some other designated output location which is periodically emptied by the operator.

After the compensation images are printed, the method proceeds to print the next block of pages 315. This process is repeated until all of the pages 310 in the print job 305 have been printed.

In some embodiments of the present invention, the compensation images 355 can be used to compensate for the image burn-in artifacts without addressing any artifacts that may result from the toner usage rate. In this case, the method of FIG. 4 can be modified by skipping the acceptable toner usage rate test 345.

In some embodiments, the method of the present invention can be combined with the methods described in commonly assigned, co-pending U.S. Patent Application Ser. No. 63/166,266, entitled: "Electrophotographic printing system with reduced burn-in artifacts", by T. Schwartz et al. and commonly assigned, co-pending U.S. Patent Application Ser. No. 63/166,267, entitled: "Electrophotographic printing system including lateral translations to reduce burn-in artifacts", by T. Schwartz et al. to further reduce the magnitude of the burn-in artifacts.

In embodiments of the present inventions, a controller (such as the logic and control unit 99 in FIG. 1) is used to implement the various operations such as some or all of the steps in the method of FIG. 4. In some embodiments the controller is a single processing unit operated by appropriate software. In other embodiments, the controller can include a plurality of different processing units each of which implement a portion of the operations.

The invention has been described in detail with particular reference to certain preferred embodiments thereof, but it will be understood that variations, combinations, and modifications can be effected by a person of ordinary skill in the art within the spirit and scope of the invention.

PARTS LIST 31 printing module
32 printing module
33 printing module
34 printing module
35 printing module
38 print image
39 fused image
40 supply unit
42 receiver
42a receiver
42b receiver
50 transfer subsystem
60 fuser module
62 fusing roller
64 pressure roller
66 fusing nip
68 release fluid application substation
69 output tray
70 finishing system
81 transport web
86 cleaning station
99 logic and control unit
100 printer
111 imaging member
112 intermediate transfer member
113 transfer backup member
201 first transfer nip
202 second transfer nip
206 photoreceptor
210 charging subsystem
211 meter
212 meter
213 grid
216 surface
220 exposure subsystem
225 development subsystem
226 toning shell
227 magnetic core
240 power source
250 page
251 printed page
252 dark image content
254 light image content
256 roughened surface
260 image burn-in artifacts
300 receive print job step
305 print job
310 page
315 block of pages
320 print block of pages step
325 printed pages
330 analyze image data step
335 average toner usage rate
340 cross-track image profiles
345 acceptable toner usage rate test
350 form compensation image step
355 compensation image
360 number of compensation images
365 print compensation images step
370 printed compensation images
375 discard compensation images step
380 acceptable toner usage rate range
505 cross-track image profile
510 cross-track image profile

The invention claimed is:

1. A method for reducing artifacts in an electrophotographic printing system, comprising:

receiving a print job including image data for a set of pages to be printed with the electrophotographic printing system;

using the electrophotographic printing system to print a block of pages from the print job to provide corresponding printed pages, wherein the electrophotographic printing system includes a development subsystem that supplies toner used to form the printed pages;

analyzing the image data for the block of pages to determine an average toner usage rate;

defining an acceptable toner usage rate range, wherein the development subsystem supplies toner with an acceptable charge when the average toner usage rate is within the acceptable toner usage rate range;

if the determined average toner usage rate for the block of pages is outside the acceptable toner usage rate range:
  determining image data for a compensation image; and
  determining a number of compensation images to be printed;
  wherein the image data for the compensation image and the number of compensation images are determined such that the average toner usage rate will be brought back into the acceptable toner usage rate range when the determined number of compensation images are printed using the electrophotographic printing system.

2. The method of claim 1, further including using the electrophotographic printing system to print the specified number of compensation images if the determined average toner usage rate for the block of pages is outside the acceptable toner usage rate range.

3. The method of claim 2, wherein the printed compensation images are directed into a waste receptacle.

4. The method of claim 2, further including using the electrophotographic printing system to print additional pages from the print job to provide additional printed pages after the printing of the compensation images.

5. The method of claim 1, wherein the compensation image is a uniform image.

6. The method of claim 5, wherein the acceptable toner usage rate range is defined by a minimum acceptable toner usage rate and a maximum acceptable toner usage rate, and wherein if the determined average toner usage rate for the block of pages is greater than the maximum acceptable toner usage rate the compensation image is a blank image.

7. The method of claim 6, wherein the number of compensation images is greater than or equal to:

$$K_m = \left\lceil \frac{S(\bar{V} - V_H)}{V_H} \right\rceil$$

where $K_m$ is the minimum number of compensation images, S is the number of pages in the block of pages, $\bar{V}$ is the average toner usage rate for the block of pages, $V_H$ is the maximum acceptable toner usage rate, and $\lceil g \rceil$ denotes a rounding up to the next integer operation.

8. The method of claim 5, wherein the acceptable toner usage rate range is defined by a minimum acceptable toner usage rate and a maximum acceptable toner usage rate, and wherein if the determined average toner usage rate for the block of pages is less than the minimum acceptable toner usage rate the compensation image is a uniform image having a toner usage rate equal to the maximum acceptable toner usage rate.

9. The method of claim 8, wherein the number of compensation images is greater than or equal to:

$$K_m = \left\lceil \frac{S(V_L - \bar{V})}{(V_H - V_L)} \right\rceil$$

where $K_m$ is the minimum number of compensation images, S is the number of pages in the block of pages, $\bar{V}$ is the average toner usage rate for the block of pages, $V_L$ is the minimum acceptable toner usage rate, $V_H$ is the maximum acceptable toner usage rate, and $\lceil g \rceil$ denotes a rounding up to the next integer operation.

10. The method of claim 1, wherein the step of determining an average toner usage rate includes computing a cross-track image profile $P^i(x)$ from the image data for each page in the block of pages:

$$P^i(x) = \frac{1}{N_y}\sum_{y=1}^{N_y} I^i(x, y)$$

where $I^i(x,y)$ is the image data for the $i^{th}$ page, x and y are cross-track and in-track pixel positions, respectively, and $N_y$ is a number of image data pixels in an in-track dimension.

11. The method of claim 10, wherein the average toner usage rate $\bar{V}_h$ for color channel h is determined using the equation:

$$\bar{V}_h = \frac{1}{N_x S}\sum_{i=1}^{S}\sum_{x=1}^{N_x} P_h^i(x)$$

where $P_h^i(x)$ is the cross-track image profile for the $i^{th}$ page and the color channel h, $N_x$ is a number of image data pixels in a cross-track dimension and S is a number of pages in the block of pages.

12. The method of claim 10, wherein the compensation image has a cross-track image profile which has an inverted shape relative to an average of the cross-track image profiles for the block of pages.

13. The method of claim 12, wherein the cross-track image profile $\hat{C}(x)$ for the compensation image is determined by:

$$\hat{C}(x) = C'(x)/K$$

where K is the number of compensation images and C'(x) is shifted total compensation image profile given by:

$$C'(x) = C(x) - \min[C(x)]$$

C(x) is a total compensation image profile given by:

$$C(x) = \sum_{i=1}^{S}(P_{max} - P^i(x))$$

and $P_{max}$ is the maximum possible value for the cross-track image profiles $P^i(x)$.

14. The method of claim 13, wherein the cross-track image profiles $P^i(x)$ are filtered with a low-pass filter before computing the total compensation image profile C(x).

15. The method of claim 13, wherein the number of compensation images K is greater than or equal to a minimum number of compensation images $K_m$ given by:

$$K_m = \left\lceil \frac{\max[C'(x)]}{P_{max}} \right\rceil$$

where $\lceil g \rceil$ denotes a rounding up to the next integer operation.

16. The method of claim 13, the pages and the compensation images have a plurality of color channels h, and wherein a cross-track image profile $\hat{C}_h(x)$ for each color channel of the compensation image is determined responsive to the cross-track image profiles $P_h^i(x)$ for the corresponding color channel of the pages in the block of pages.

17. The method of claim 1, wherein the pages have a plurality of color channels, and wherein a minimum number of compensation images is determined independently for each color channel, and wherein a number of compensation images is determined to be greater than or equal to the maximum value of the minimum number of compensation images for each color channel.

18. A method for reducing artifacts in an electrophotographic printing system, comprising:

receiving a print job including image data for a set of pages to be printed with the electrophotographic printing system;

designating a block of images from the print job to be printed using the electrophotographic printing system to provide corresponding printed pages, wherein the electrophotographic printing system includes a development subsystem that supplies toner used to form the printed pages;

analyzing the image data for the block of pages to determine an average toner usage rate;

defining an acceptable toner usage rate range, wherein the development subsystem supplies toner with an acceptable charge when the average toner usage rate is within the acceptable toner usage rate range;

if the determined average toner usage rate for the block of pages is outside the acceptable toner usage rate range:

determining image data for a compensation image; and determining a number of compensation images to be printed;

wherein the image data for the compensation image and the number of compensation images are determined such that the average toner usage rate will be brought back into the acceptable toner usage rate range when the determined number of compensation images are printed using the electrophotographic printing system.

* * * * *